United States Patent [19]

Hamaoka et al.

[11] 4,302,830
[45] Nov. 24, 1981

[54] OPTICAL INFORMATION READING-OUT APPARATUS

[75] Inventors: Takashi Hamaoka, Hino; Shunpei Tanaka; Toru Musha, both of Hachioji; Kenichi Oinoue, Tokyo, all of Japan

[73] Assignee: Olympus Optical Company Ltd., Tokyo, Japan

[21] Appl. No.: 35,334

[22] Filed: May 1, 1979

[30] Foreign Application Priority Data

| May 10, 1978 [JP] | Japan | 53-54366 |
| May 10, 1978 [JP] | Japan | 53-54367 |
| May 30, 1978 [JP] | Japan | 53-63774 |

[51] Int. Cl.³ .................... G11B 7/00; G11B 21/02; G11B 21/16
[52] U.S. Cl. ...................... 369/45; 250/201; 350/247; 369/44
[58] Field of Search ............ 179/100.1 G, 100.3 D, 179/100.3 M, 100.3 V; 358/128.5, 128.6; 250/201; 350/6, 3, 247; 369/44, 45, 46, 119

[56] References Cited

U.S. PATENT DOCUMENTS

| 4,011,003 | 3/1977 | Dragt | 179/100.3 V |
| 4,032,776 | 6/1977 | van Rosmalen | 250/201 |
| 4,063,287 | 12/1977 | van Rosmalen | 179/100.3 V |
| 4,074,312 | 2/1978 | van Rosmalen | 179/100.3 V |
| 4,092,529 | 5/1978 | Aihara et al. | 369/44 |
| 4,193,091 | 3/1980 | Kleuters et al. | 358/128.5 |

Primary Examiner—Bernard Konick
Assistant Examiner—Donald McElheny, Jr.
Attorney, Agent, or Firm—Haseltine and Lake

[57] ABSTRACT

An optical information reading-out apparatus which makes use of a focusing and tracking mechanism including first and second leaf springs for connecting an objective lens supporting body to first and second supporting members, respectively, and adapted to be moved in tracking and focusing directions when subjected to a magnetic force or to the action of piezoelectric elements.

16 Claims, 44 Drawing Figures

OPTICAL INFORMATION READING-OUT APPARATUS

BACKGROUND OF THE INVENTION

1. Field of the Invention

This invention relates to an optical information reading-out apparatus such as a video disc reproduction apparatus or the like which makes use of a focusing and tracking mechanism for driving an objective lens in both focusing and tracking directions.

2. Description of the Prior Art

In an optical information reading-out apparatus such as a video disc reproduction apparatus or the like, it is required to focus an objective lens on an information track recorded on a video disc so as to cause a reading-out light flux to precisely converge onto a video disc surface and it is also required to correct tracking errors so as to cause the light flux to trace a given information track recorded on the video disc. In this case, one of problems which have heretofore been encountered in the prior art techniques consist resides in the manner of driving an objective lens with the aid of focusing and tracking signals which have been derived from the information track by a suitable means. Heretofore, it has often been proposed to arrange a galvanomirror in part of a light path of the light flux reading out the track and supply a tracking signal to the galvanomirror so as to deflect the light flux in a direction perpendicular to the track. As a result, the light flux passes in a direction which in inclined with respect to an optical axis of the objective lens or the like in response to the step of correcting the tracking error. In this case, it is necessary to eliminate not only spherical aberration but also astigmatism or the like of an optical system including the objective lens or the like for the purpose of precisely converging the light flux onto the video disc surface. As a result, the optical system becomes large in size, difficult in design, complex in construction and heavy in weight. Thus, it is difficult to provide an objective lens driving mechanism having an excellent frequency and damping characteristic. The disadvantage of such mechanism is that it is large in size and complex in construction.

It has also been proposed to correct the tracking error by displacing the light flux in parallel to the optical axis without inclining the light flux with respect to the optical axis. For this purpose, the objective lens may be constructed in such a manner that it is movable in a plane perpendicular to the optical axis. In this case, if the movement of focusing the objective, that is, the movement of the objective lens in the direction of the optical axis is taken into consideration, the objective lens must be so constructed that it is movable not only in a plane perpendicular to the optical axis but also in the optical axis direction.

If a mechanism for driving and focusing the objective lens in the optical axis direction is enclosed in a lens holding body, the mass of a movable member for correcting the tracking error becomes large, and as a result, the mechanism as a whole becomes too large in size to be able to effect an excellent control. That is, the focusing movement of the objective lens is required to be larger in amplitude than the movement of the objective lens for correcting the tracking error by the order of one figure. As a result, the driving mechanism for focusing the objective lens becomes large in size by all means. It is very difficult, therefore, to construct such driving mechanism in a manner that it can not only focus the objective lens but also correct the tracking error thereof.

SUMMARY OF THE INVENTION

An object of the invention, therefore, is to provide an optical information reading-out apparatus which does not involve any undesired movement of an objective lens in the case of correcting a tracking error nor involve any undesired movement of the objective lens due to external oscillations, which is small in size and light in weight, and which does not cause the optical axis of the objective lens to incline when both the tracking error is being corrected and the objective lens is being focused.

A feature of the invention is the provision of an optical information reading-out apparatus comprising a light source, a record medium including an information track spirally or concentrically recorded thereon, an optical system including an objective lens movably supported by its holding body, said optical system receiving light from said light source and projecting a read out light spot onto said record medium, and a focusing and tracking mechanism for driving said objective lens so as to correct a relative displacement between said information track and said read out light spot, said mechanism including a first leaf spring having one end connected to said objective lens or its holding body and another end connected to a first supporting member; a second leaf spring having one end connected to said objective lens or its holding body and another end connected to a second supporting member, said first and second leaf springs being symmetrically arranged with respect to an optical axis of said objective lens or a plane inclusive of said optical axis, and a pair of opposed electromagnets between which are arranged said first and second leaf springs and said objective lens with or without its holding body, either one of both of said first and second leaf springs and said objective lens holding body being formed of magnetic material.

Further objects and features of the invention will be fully understood from the following detailed description with reference to the accompanying drawings, in which:

DETAILED DESCRIPTION OF THE PREFERRED EMBODIMENTS

Figure 1:
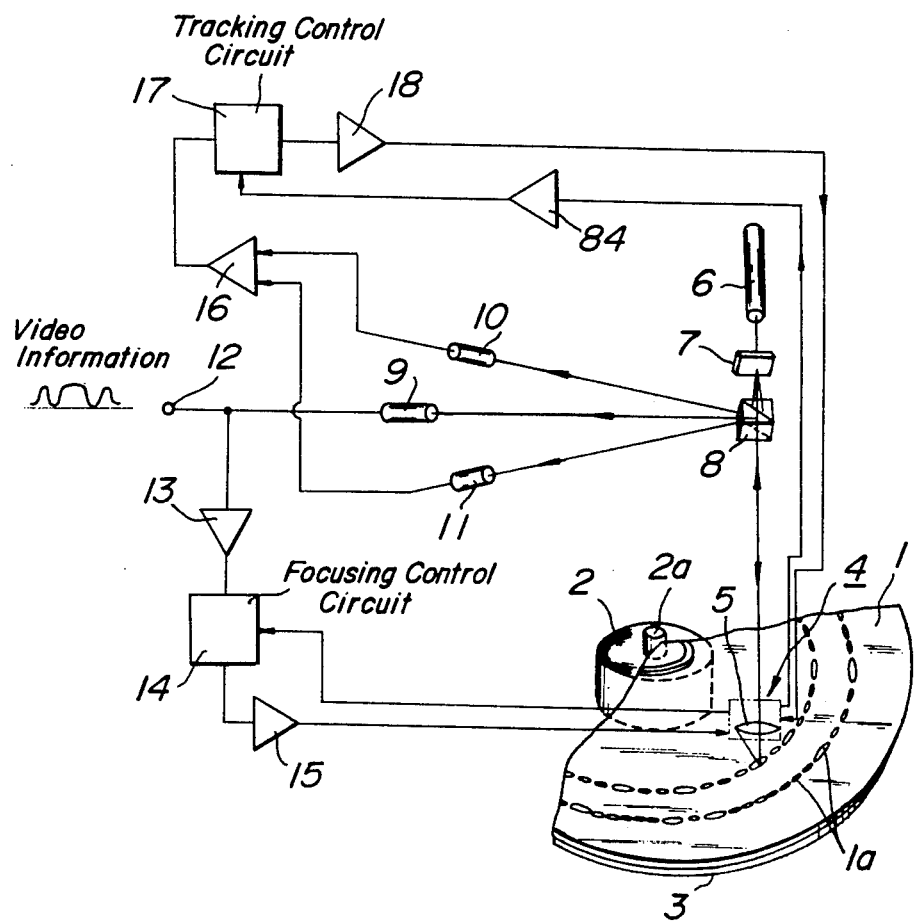
FIG. 1 is a diagrammatic view of one embodiment of an optical information read out apparatus according to the invention.

FIG. 1 shows one embodiment of an optical information read out apparatus according to the invention. Referring to FIG. 1, a video disc 1 is mounted on a turn table 3 firmly secured to a rotary shaft 2a of a motor 2 and adapted to be rotated at a given speed. On the video disc 1 is recorded a spirally or concentrically formed information track 1a composed of coded indentation pits. The apparatus shown in FIG. 1 is a so-called reflection type video disc reproduction apparatus which can receive a read out light flux reflected from the information track 1 it as and reproduce a video information.

To that side surface of the video disc 1 which is provided with the information track 1a is opposed a focusing and tracking mechanism 4. The mechanism 4 functions to displace an objective lens 5 with respect to the video disc 1 both in the direction of the optical axis and in a direction perpendicular to the optical axis direction and hence to a direction of the information track 1a recorded on the video disc 1 so as to precisely focus the read out light flux on the information track 1a and to correct a tracking error and hence cause the read out light flux to precisely trace the information track 1a.

In the present embodiment, in order to correct the tracking error, use is made of two tracking light fluxes other than the read out light flux. These two tracking fluxes are focused on both sides of the information track 1a so as to form light spots thereon, respectively. These three light fluxes composed of one read out light flux and two tracking light fluxes may be obtained from three independent light sources. But, in the present embodiment, a laser light emitted from one laser light source 6 is incident on a hologram plate 7 to obtain 0 order diffraction light flux and ± primary diffraction light fluxes. These three light fluxes are incident through a beam splitter 8 on the objective lens 5.

The mechanism 4 functions not only to focus the above mentioned three light fluxes on given positions on the video disc 1, respectively, but also to scan the video disc 1 in its radial direction. Three reflected lights from the video disc 1 are incident through the objective lens 5 and beam splitter 8 on three photoelectric converters 9, 10 and 11.

The reflected light from the information track 1a is incident on the photoelectric converter 9 to deliver a video information signal from an output terminal 12. This video information signal is also supplied to an amplifier 13. The amplifier 13 functions to compare the video information signal with a given standard value and detects any difference therebetween, that is, it produces a focusing error signal. The focusing error signal is supplied through a focusing control circuit 14 and amplifier 15 to the mechanism 4, thereby focusing the objective lens 5 on the information track 1a. In this case, the amount of movement of the objective lens 5 in its optical axis direction effected by the mechanism 4 is detected and fed back to the focusing control circuit 14, thereby controlling the focusing operation in a motion feed back manner.

The reflected tracking light fluxes from the video disc 1 are incident on the photoelectric converters 10 and 11, respectively, and converted into electric signals which are supplied to a differential amplifier 16. The differential amplifier 16 functions to compare output signals from the photoelectric converters 10, 11 with each other and detect a difference signal, that is, a tracking error signal. The tracking error signal is supplied through a tracking control circuit 17 and amplifier 18 to the mechanism 4 so as to effect the tracking operation of the objective lens 5. In this case, the amount of movement of the objective lens 5 in the direction perpendicular to its optical axis effected by the mechanism 4 is detected and the signal thus detected is supplied through a differential amplifier 84 to the tracking control circuit 17, thereby controlling the tracking operation in a motion feed back manner.

Figure 2:
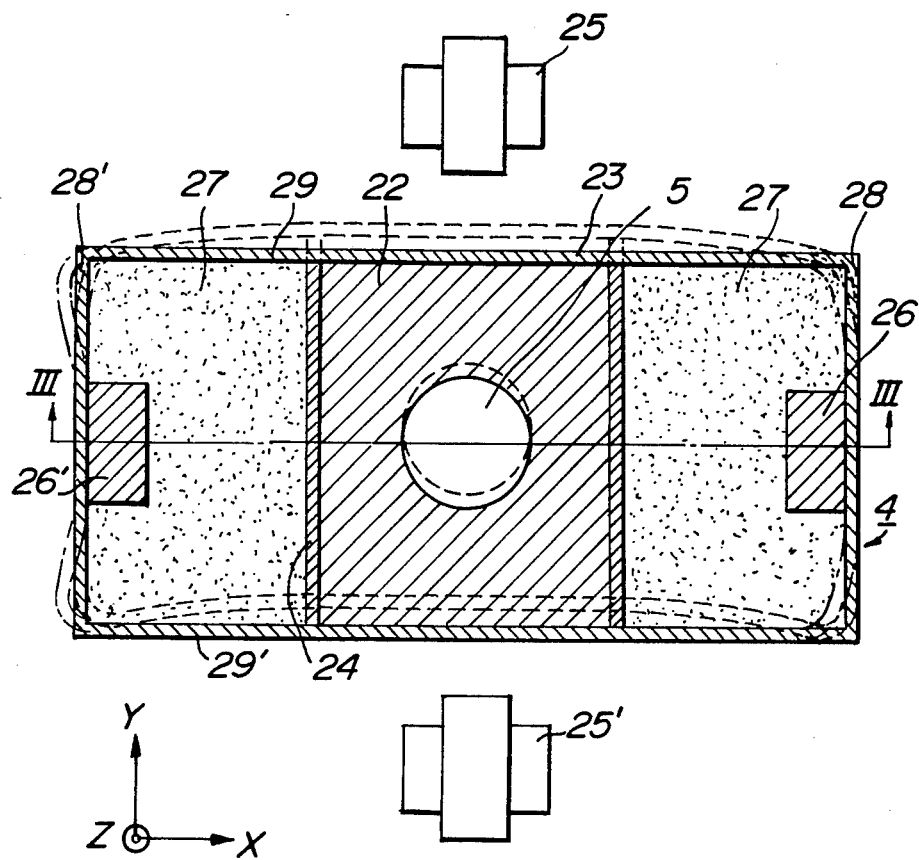
FIG. 2 is a cross-sectional view of a conventional objective lens driving mechanism.

FIG. 2 shows a conventional focusing and tracking mechanism. Referring to FIG. 2, an X direction is a track direction and a Y direction is a direction perpendicular to the track direction. A displacement in the Y direction means a deviation from the track direction, that is, a tracking error. A displacement in the X direction means a time error of a read out signal, that is, a time base error.

An objective lens 5 is secured to a lens holder 22 which is secured to an elastic frame 23. Reference numeral 24 designates a side plate extending across the elastic frame 23. The elastic frame 23 is formed of a magnetic material and adapted to be subjected to a magnetic force from electromagnets 25, 25' when they are energized. These electromagnets 25, 25' are opposed to the outsides of the elastic frame 23, respectively. The elastic frame 23 is secured to supporting posts 26, 26' and made stationary. As a result, the elastic frame 23 as a whole could not be moved by the magnetic force acting upon it from the electromagnets 25, 25', but becomes bent as shown by dotted lines, and as a result, the objective lens 5 is moved in parallel to the Y direction as shown by dotted lines. A space formed between the side plate 24 and the elastic frame 23 is filled with silicon rubber, silicon grease or the like 27 which functions as a damper. If desired, the above mentioned mechanism for moving the objective lens 5 in the Y direction as a whole may be enclosed in a mechanism for moving the objective lens 5 in the X direction so as to correct both the tracking error and the time base error.

In FIG. 2, a mechanism for moving the objective lens 5 in the direction of the optical axis, that is, in the Z direction is not shown. But, such mechanism may be incorporated into the lens holder 22, for example, so as to move the objective lens 5 in the Z direction and hence adjust the focusing operation thereof.

In the conventional objective lens driving mechanism shown in FIG. 2, those surfaces 28, 28' of the elastic frame 23 which are secured to the supporting poles 26, 26' also become bent as shown by dot and dash lines in FIG. 2, so that it is not possible to precisely determine the position of the objective lens 5 in the Y direction. As a result, in the case of correcting the tracking error, the movement of the objective lens 5 in the Y direction results in an undesired movement of the objective lens 5 in the X direction or there is a risk of the objective lens 5 being moved also in the X direction by exterior oscillations acting upon it, thereby inducing the time base error.

If the supporting posts 26, 26' are made large in width, it is possible to eliminate the flexure of those portions 28, 28' of the elastic frame 23 which are shown by dot and dash lines. But, the use of the supporting posts 26, 26' which are large in width results in a restriction of the deformation of the elastic frame 23 in its desired direction, that is, in the Y direction, because the supporting posts 26, 26' are located at both ends of those surfaces 28, 28' of the elastic frame 23 which are deformed in response to the movement of the objective lens 5 in the Y direction.

In addition, if the mechanism for driving and focusing the objective lens 5 in the Z direction is enclosed in the lens holder 22, the movable member for correcting the tracking error becomes large in mass and hence the mechanism as a whole which can effectively control the objective lens becomes large in size. That is, the movement required for the focusing operation must be made larger in amplitude than the movement required for correcting the tracking error by the order of one figure. As a result, the conventional objective lens driving mechanism is large in size by all means and hence it is difficult to construct the conventional driving mechanism such that it can move so as to correct the tracking error.

Figure 4:
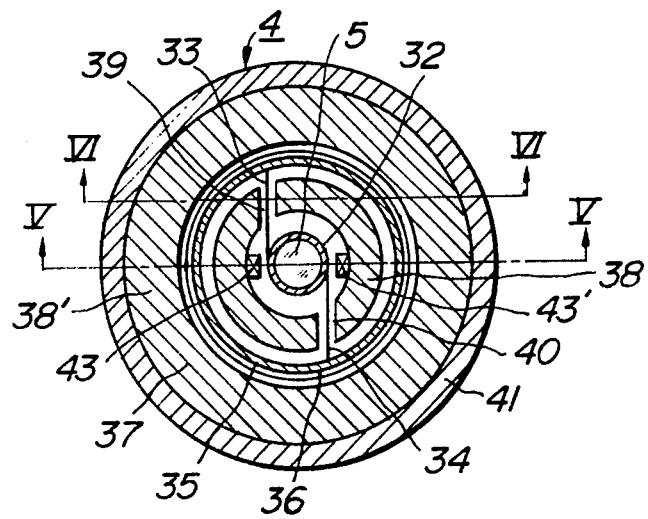
FIG. 4 is a cross-sectional view of one embodiment of an objective lens driving mechanism according to the invention, parts being shown in section in a plane perpendicular to an optical axis of an objective lens.
Figure 5:
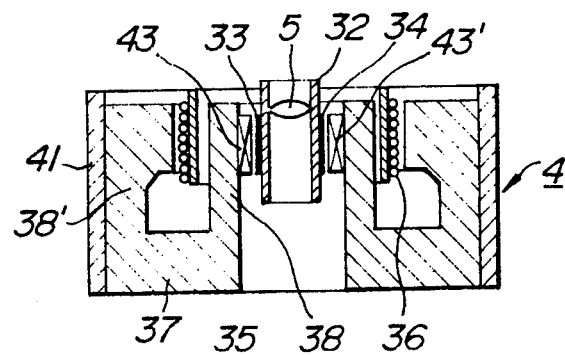
FIG. 5 is a section on line V—V of FIG. 4.

FIGS. 4 and 5 show one embodiment of an objective lens driving mechanism according to the invention. In the present embodiment, an objective lens 5 is secured to a lens holding cylinder 32. The lens holding cylinder 32 is connected through two leaf springs 33, 34 to a coil bobbin 35. The lens holding cylinder 32 or two leaf springs 33, 34 is or are formed of magnetic material. These two leaf springs 33, 34 function to correct the tracking error and do not bend in a direction perpendicular to the drawing, that is, in the optical axis direction, so that the objective lens holding cylinder 32 and the coil bobbin 35 are made integral into one body and move for optical axis direction in the focusing the objective lens 5. Around the coil bobbin 35 is wound a coil 36. The coil bobbin 35 is arranged between the inner and outer cylindrical portions 38, 38' of a magnet 37. The inner cylindrical portion 38 of the magnet 37 is provided at its diametrically opposite positions with holes 39, 40 through which are extended the above mentioned leaf springs 33, 34, respectively, and which allow the coil bobbin 35 and lens holding cylinder 32 to freely move in the optical axis direction.

Figure 9:
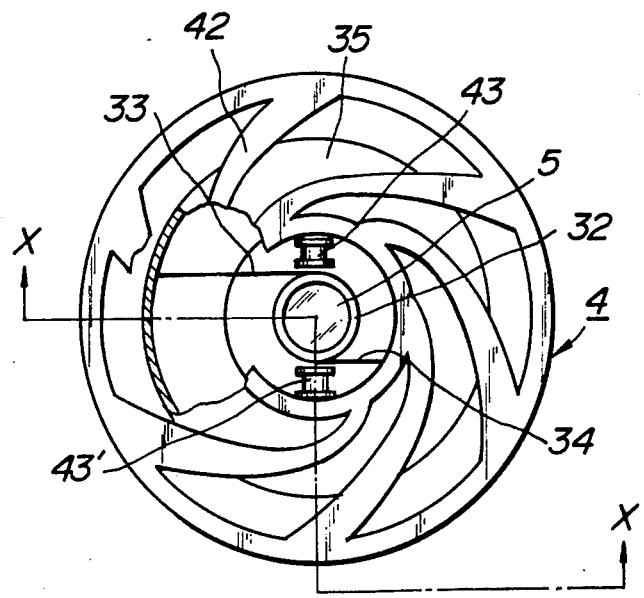
FIG. 9 is a plan view of a further embodiment of an objective lens driving mechanism according to the invention.

In addition, the coil bobbin 35 is connected through a leaf spring 42 for correcting the focusing error to a supporting frame 41 for supporting the above mentioned magnet 37. The leaf spring 42 may be composed of a spider-shaped leaf spring as shown in FIG. 9, for example.

If the coil 36 is energized the lens holding cylinder 32 together with the coil bobbin 35 are moved in the optical axis direction, so that it is possible to control the focusing movement of the objective lens 5 in response to current flowing in the coil 36. The use of the mechanism constructed as above described according to the invention ensures a correction of the focusing error.

A mechanism for correcting the tracking error will now be described.

As shown in FIGS. 4 and 5, the magnet 37 is provided at the inner surfaces of its inner cylindrical portions 38 with two opposed electromagnets 43, 43'. If one of these electromagnets 43 or 43' is supplied with the tracking error signal as described with reference to FIG. 1, there is produced a magnetic force which acts upon one of the magnetic leaf springs 33 or 34 to attract it toward one of these electromagnets 43 or 43', thus moving the lens holding cylinder 32 in the direction perpendicular to the optical axis, that is, in the V—V direction. As a result, it is possible to control the operation of correcting the tracking error by controlling the electric current flowing in the electromagnet 43 or 43'.

It is a matter of course that the operation of correcting both the tracking error and the focusing error is effected on the basis of a tracking error signal and focusing error signal detected as described with reference to FIG. 1.

The objective lens driving mechanism constructed as above described according to the invention is capable of moving the objective lens 5 supported by the two leaf springs 33, 34 in the Y direction and of correcting the tracking error only without moving the objective lens 5 in any other directions such, for example, in the X direction. As a result, the mechanism can effectively correct the tracking error. In addition, there is no risk of the optical axis being inclined in response to the operation of correcting the tracking error.

Figure 3:
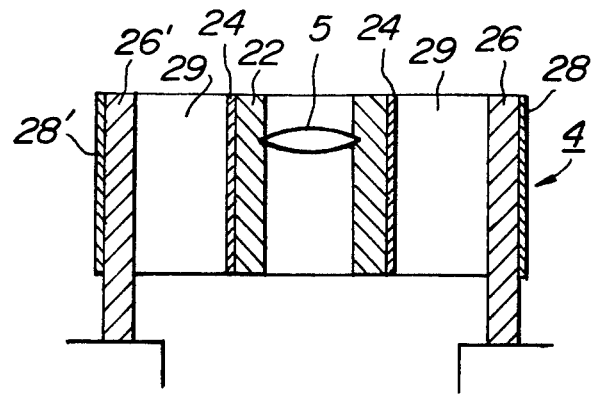
FIG. 3 is a section on line III—III of FIG. 1, parts being shown on a reduced scale.
Figure 6:
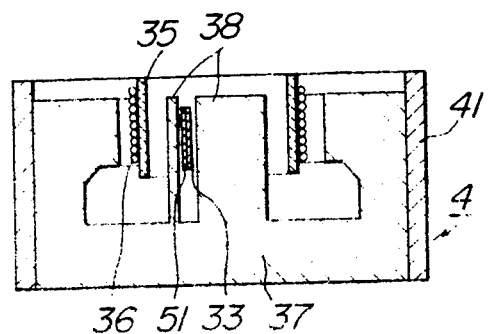
FIG. 6 is a section on line VI—VI of FIG. 4 and showing another embodiment of an objective lens driving mechanism according to the invention.

FIG. 6 shows another embodiment of an objective lens driving mechanism according to the invention. In the present embodiment, each of the leaf springs 33, 34 shown in FIGS. 3 and 4 and for correcting the tracking error is provided with a piezoelectric element 51. The piezoelectric element 51 functions to detect a deformation of the leaf springs 33, 34 and hence detect the amount of movement of the objective lens 5. This amount of movement of the objective lens 5 is fed back to the tracking control circuit 17 as described with reference to FIG. 1, thereby effectively controlling the operation of correcting the tracking error.

The embodiment shown in FIG. 6 is provided at the leaf spring 33 with the piezoelectric element 51. However, parts other than the piezoelectric element 51 are the same as those shown in the embodiment shown in FIGS. 4 and 5.

The piezoelectric element 51 secured to the objective lens supporting leaf spring can not only detect the amount of displacement of the leaf spring but also displace the leaf spring by applying a tracking signal to the piezoelectric element 51. That is, use may be made of the piezoelectric element 51 instead of the electromagnet 43, 43' for the purpose of correcting the tracking error.

Figure 7:
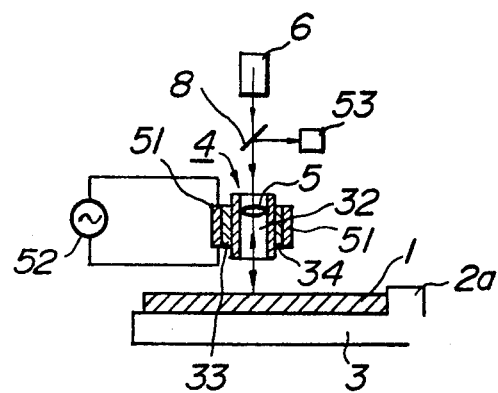
FIG. 7 is a diagrammatic view of another embodiment of an optical information read out apparatus according to the invention.

FIG. 7 shows another embodiment of an optical information read out apparatus according to the invention. In the present embodiment, an objective lens 5 and lens holding cylinder 32 are supported by leaf springs 33, 34 (corresponding to the leaf springs 33, 34 shown in FIGS. 3 and 4) and adapted to be moved in the direction for correcting the tracking error. A signal having a constant amplitude and number of oscillation is supplied from a voltage source 52 to a piezoelectric element 51 secured to the leaf spring 33 so as to cause the objective lens 5 to minutely oscillate in the direction for correcting the tracking error. A laser light is emitted from a laser light source 6 and reflected at a beam splitter 8 and then is incident on a light receiver 53 which functions to read out that information which is modulated by the oscillation of the objective lens 5.

Figure 8A:
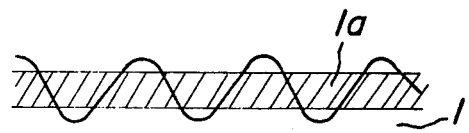
FIG. 8A is a diagrammatic view of a modulation mode of an output from the light receiver shown in FIG. 7 under a normal tracking condition.
Figure 8B:
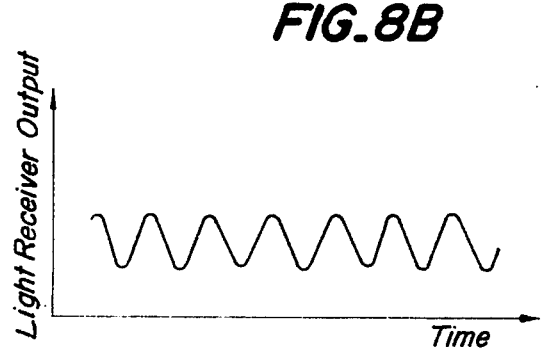
FIG. 8B is a graph of the modulation mode shown in FIG. 8A.

FIG. 8A shows a mode of modulation of the information read out by the light receiver 53 when the tracking operation of correcting the tracking error is normally effected. The above mentioned minute oscillations are effected about the center of the information tracks 1a, 1a recorded on the video disc 1 so that the modulation becomes substantially constant in amplitude and period as shown by a curve in FIG. 8A and by a light receiver output in FIG. 8B.

Figure 8C:
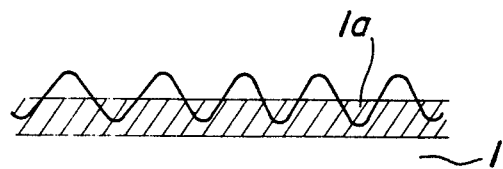
FIGS. 8C and 8C' are diagrammatic views of a modulation mode of the output from the light receiver shown in FIG. 7 under an abnormal tracking condition.

FIGS. 8C and 8C' show a mode for modulation of the information read out by the light receiver 53 which is used when the operation of correcting the tracking error becomes abnormal.

Figure 8D:
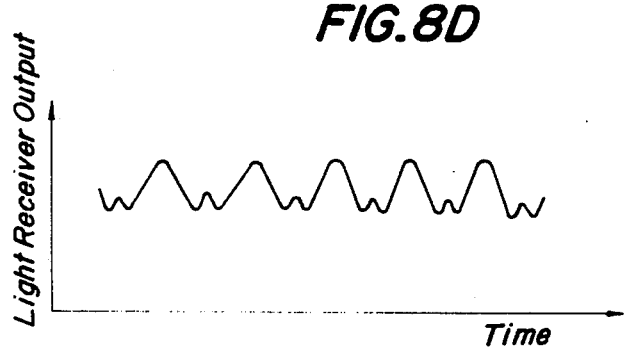
FIGS. 8D and 8D' are graphs of the modulation mode shown in FIGS. 8C and 8C', respectively.
Figure 8C:
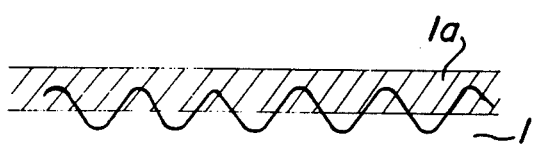
Figure 8D:
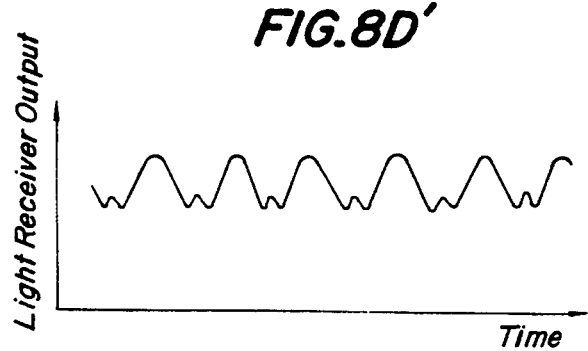

In this case, the modulation of the information becomes changed not only in amplitude but also in period as shown by the curve in FIGS. 8C and 8C' and a light receiver output in FIG. 8D and 8D', so that it is possible to derive a signal showing the tracking error from such information.

Figure 10:
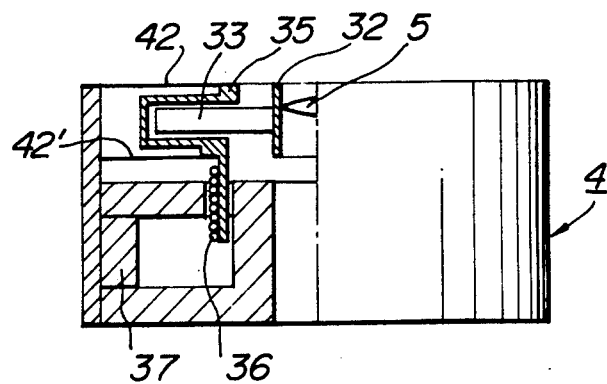
FIG. 10 is a section on line X—X of FIG. 9.

FIGS. 9 and 10 show a further embodiment of an objective lens driving mechanism according to the invention. This embodiment is basically the same as the embodiment described with reference to FIGS. 4 and 5. In the present embodiment, a coil bobbin 35 is connected through leaf springs 33 and 34 extending in a direction perpendicular to the direction of the leaf springs 33 and 34 shown in FIGS. 4 and 5 to an objective lens holding cylinder 32 and hence to an objective lens 5.

In the present embodiment, leaf springs 42, 42' for focusing the objective lens 56 are located above and below the objective lens holding cylinder 32 and connect the coil bobbin 35 to a magnet 37, so that the optical lens axis is prevented from inclining when the lens holding cylinder 32 moves in the optical axis direction.

In addition, in the present embodiment, the coil bobbin 35 is extended downwardly to form a lower portion around which is wound a coil 36 and the magnet 37 is arranged such that the lower portion of the coil bobbin 35 is located between the opposed inner and outer cylindrical portions of the magnet 37. As a result, it is possible to omit the holes 39, 40 provided for the inner cylindrical portion 38 of the magnet 37 of the embodiment shown in FIGS. 3 and 4.

In the present embodiment, electromagnets 43, 43' for correcting the tracking error are arranged at those diametrically opposite positions of the objective lens holding cylinder 32 which are perpendicular to the positions of the electromagnets 43, 43' shown in FIG. 4. Similar to the embodiment described with reference to FIGS. 3 and 4, if the electromagnet 43 or 43' is energized, it is possible to control the operation of correcting the tracking error.

In the embodiments shown in FIGS. 4 and 5 and FIGS. 9 and 10, the two leaf springs 33, 34 for correcting the tracking error are symmetrically arranged with respect to the optical axis of the objective lens 5 and the one or two leaf springs 42, 42' for focusing the objective lens 5 are also symmetrically arranged with respect to a plane inclusive of the optical axis of the objective lens 5. As a result, no undesired oscillations occur irrespective of whether that an oscillation system composed of a movable member for correcting the tracking error in a direction perpendicular to the optical axis direction of an objective lens 5 is disposed on an oscillation system composed of a movable member for focusing the objective lens in the optical axis thereof.

In the embodiment described with reference to FIGS. 4 and 5 and FIGS. 9 and 10, the leaf springs for correcting the tracking error are secured to the objective lens holding cylinder at those diametrically opposite positions thereof which are in parallel with the tracking direction.

Figure 11:
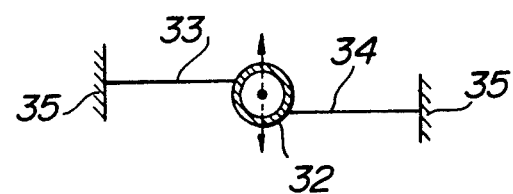
FIG. 11 is a cross-sectional view of still a further embodiment of an objective lens driving mechanism according to the invention.

Alternatively, leaf springs 33, 34 for correcting the tracking error may be secured to the objective lens holding cylinder 32 at those diametrically opposite positions which are not in parallel with the tracking direction shown by dotted arrows in FIG. 11. In addition, if the piezoelectric element is secured to the leaf spring so as to use the piezoelectric element as a driving source for the objective lens or use it to detect the amount of displacement of the leaf spring, the piezoelectric element may be secured to either one or both faces of the leaf spring.

Figure 12:
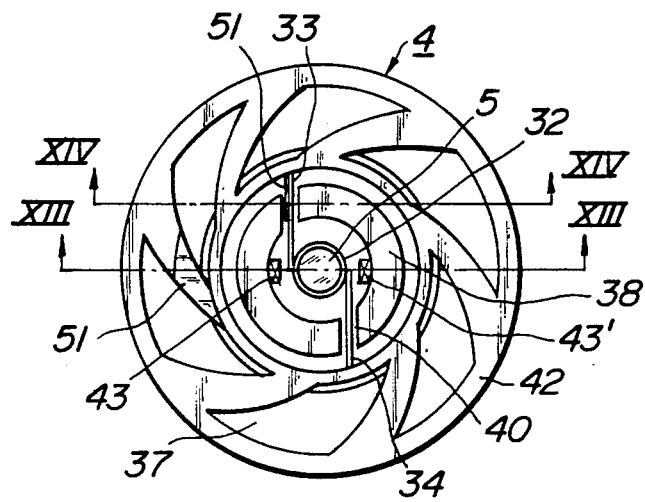
FIG. 12 is a plan view of another embodiment of an objective lens driving mechanism according to the invention.
Figure 13:
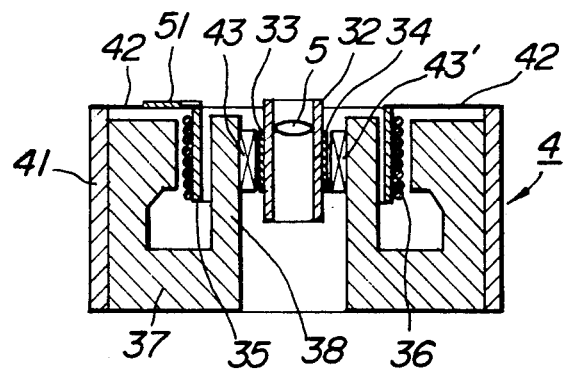
FIG. 13 is a section on line XIII—XIII of FIG. 12.
Figure 14:
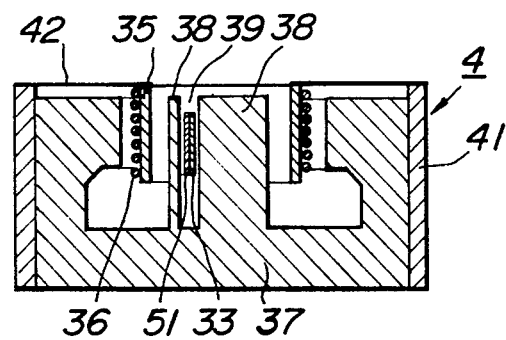
FIG. 14 is a section on line XIV—XIV of FIG.12.

FIGS. 12, 13 and 14 show another embodiment of an objective lens driving mechanism according to the invention. In the present embodiment, the leaf spring 42 has secured to it at least one piezoelectric element 51 so as to detect an electric signal induced therein in response to the deformation of the leaf spring 42, that is, the amount of movement of the objective lens 5 in its optical axis direction. The electric signal thus detected is supplied to the focusing control circuit 14 shown in FIG. 1 to control the focusing operation in a motion feed back manner. As a result, it is possible to precisely effect the focusing operation.

In addition, as shown in FIGS. 12 and 14, the leaf spring 33 has secured to it a piezoelectric element 51 so as to detect an electric signal induced therein in response to the deformation of the leaf spring 33, that is, the amount of movement of the objective lens 5 in the tracking direction. The electric signal thus detected is supplied to the tracking control circuit 17 shown in FIG. 1 to control the tracking operation in a motion feed back manner.

Figure 15:
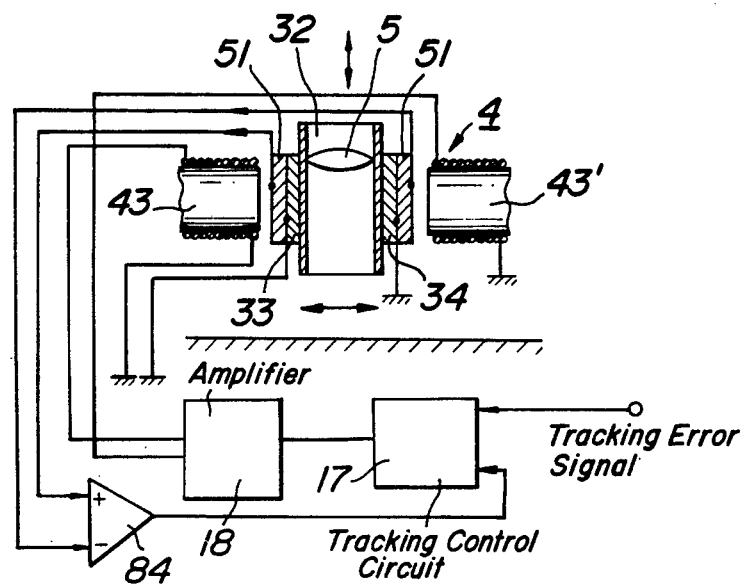
FIGS. 15, 16 and 17 are diagrammatic views of other embodiments of an optical information read out apparatus according to the invention.

FIG. 15 shows another embodiment of an optical information read out apparatus according to the invention. In the present embodiment, both leaf springs 33, 34 have secured thereto piezoelectric elements 51, 51, respectively, so as to detect an electric signal induced therein in response to the deformation of the leaf springs 33, 34. The electric signal thus detected is supplied to a differential amplifier 84 whose output is fed back to a tracking control circuit 17, thereby controlling the tracking operation in a motion feed back manner.

Figure 16:
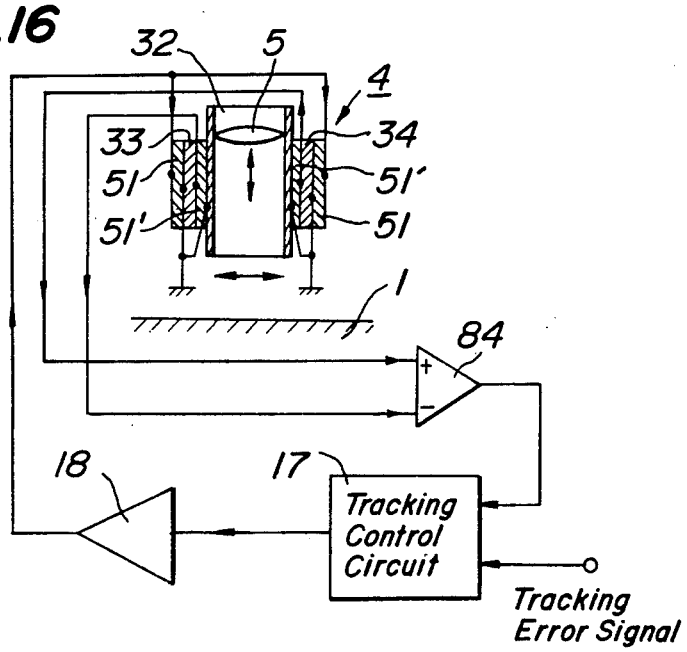

FIG. 16 shows a further embodiment of an optical information read out apparatus according to the invention. In the present embodiment, the electromagnets 43, 43' shown in FIG. 15 are omitted and to both sides of each of the leaf springs 33, 34 are secured a pair of piezoelectric elements 51, 51', respectively, with each of the leaf springs 33, 34 sandwiched between these piezoelectric elements 51, 51', respectively. To the outer piezoelectric elements 51, 51 the tracking error signal is supplied through a tracking control circuit 17 and amplifier 18 so as to cause the outer piezoelectric elements 51, 51 to oscillate in the optical axis direction, that is, in a direction perpendicular to the track direction. In this case, the inner piezoelectric elements 51', 51' become deformed in response to the movement of the lens holding cylinder 32, that is, the objective lens 5, thereby inducing electric currents. The electric currents thus induced are compared with each other in a differential amplifier 84 whose output signal is fed back to the tracking control circuit 17, thereby controlling the tracking operation in a motion feed back manner.

As seen from the above, in the present embodiment, the piezoelectric element functions to not only correct the tracking error of the objective lens but also to control the tracking operation in the motion feed back manner. As a result, the leaf springs 33, 34 or the lens holding cylinder 32 are not always formed of magnetic material.

In the above described embodiments, use has been made of two tracking light fluxes for the purpose of detecting the tracking error signal. Alternatively, the objective lens may be minutely oscillated by the piezoelectric element so as to detect the tracking error signal from the reflected light of the read out light flux, thereby controlling the tracking operation without using the tracking light fluxes.

Figure 17:
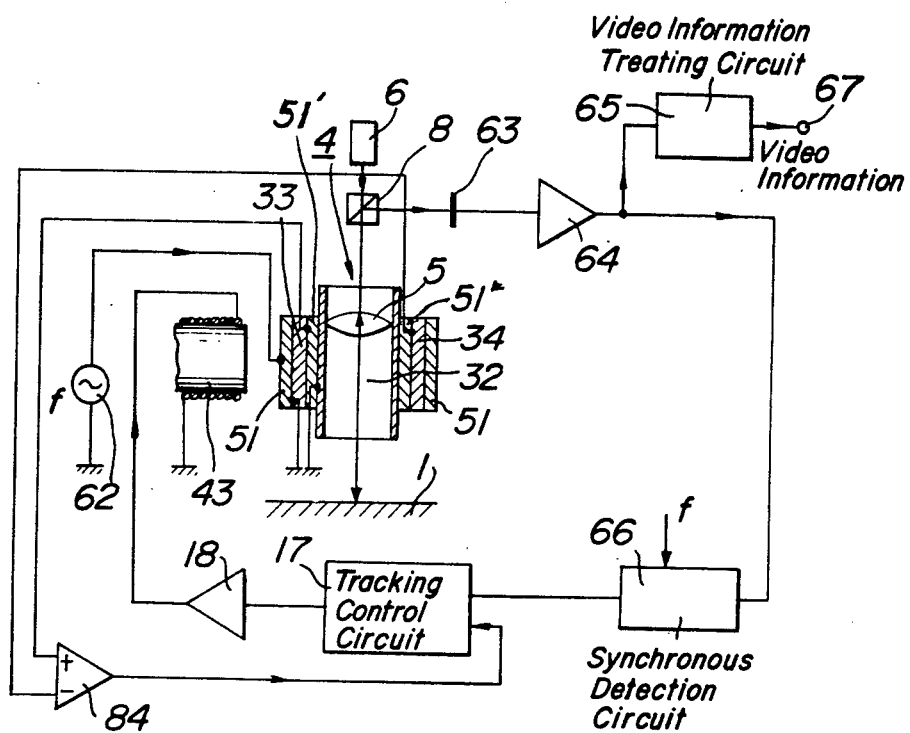

FIG. 17 shows a still further embodiment of an optical information read out apparatus according to the invention. In the present embodiment, use is made of the objective lens driving mechanism 4 shown in FIG. 16. To the outer piezoelectric element 51 is connected a voltage source 62 which functions to supply a voltge having a constant amplitude and frequency f which is considerably lower than that of the video information. As a result, the objective lens supporting cylinder 32 becomes minutely oscillated in a direction perpendicular to the optical axis and to the direction of the track 1a recorded on the video disc 1. As the same time, the laser light is emitted from the laser light source 6 and converged through the beam splitter 63 and objective lens 5 onto the video disc 1. As a result, the light spot of the read out light flux on the video disc 1 minutely oscillates in resonse to the oscillations of the objective lens 5.

Figure 18A:
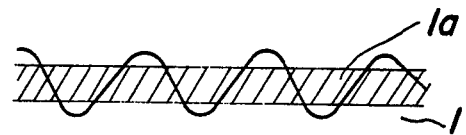
FIG. 18A is a diagrammatic view of a read out light flux under a normal tracking condition.
Figure 18B:
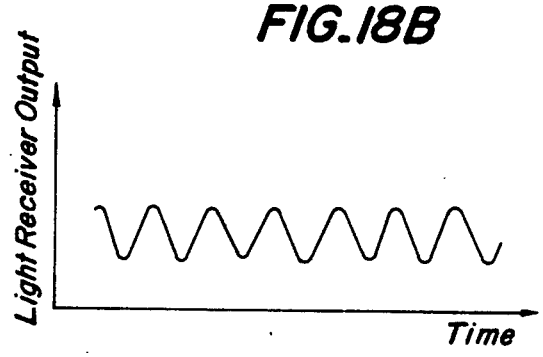
FIG. 18B is a graph of an output current from the photoelectric converter shown in FIG. 17 under the normal tracking condition shown in FIG. 18A.

The reflected light from the video disc 1 passes through the objective lens 5 and beam splitter 8 and is incident on a photoelectric converter 63. In this case, if the read out light flux precisely traces the information track 1a recorded on the video disc 1 as shown by an enlarged arrow in FIG. 18A, the photoelectric converter 63 functions to supply an output current shown in FIG. 18B and having a substantially constant amplitude and modulated by a frequency which is two times higher than that of the voltage source 62.

Figure 18C:
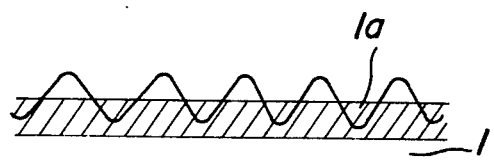
FIGS. 18C and 18C' are diagrammatic views of a read out light flux under an abnormal tracking condition.
Figure 18D:
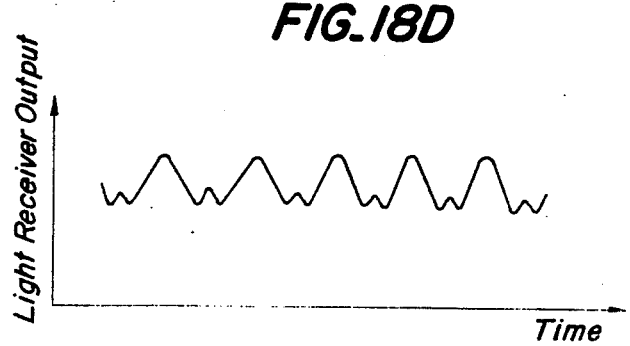
FIGS. 18D and 18D' are graphs of an output current from the photoelectric converter shown in FIG. 17 under the abnormal tracking condition shown in FIGS. 18C and 18C', respectively.
Figure 18C:
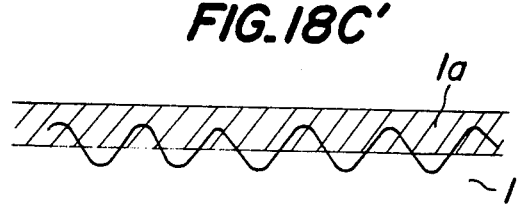
Figure 18D:
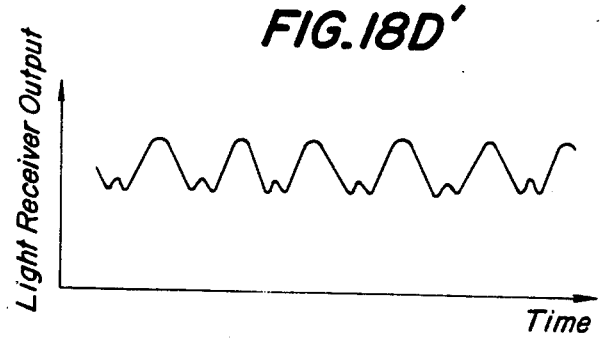

If the read out light flux does not trace the information track 1a as shown by a curve in FIGS. 18C and 18C', the photoelectric converter 63 functions to supply an output current shown in FIGS. 18D and 18D' and having an amplitude which becomes varied over of time.

As shown in FIG. 17, the output current from the photoelectric converter 63 is supplied through an amplifier 64 to a video information treating circuit 85 and to a synchronous detection circuit 66. The video information treating circuit 65 functions to separate a video information signal from the output signal from the amplifier 64, the video information signal being supplied to an output terminal 67. The synchronous detection circuit 66 serves to detect the frequency component output signals shown in FIGS. 18B and 18D derived from the oscillation of the piezoelectric element 51 and also detect the tracking error signal from the above mentioned output signals and the standard signal under the normal tracking condition, the tracking error signal being supplied to a tracking control circuit 17. The tracking control circuit 17 functions to treat the tracking error signal and supply an electric current corresponding to the tracking error signal through the amplifier 18 to the electromagnet 43. As a result, the electromagnet 43 causes the lens holding cylinder 32 to move through the leaf spring 33 in the direction perpendicular to the optical axis direction and the track direction, thereby correcting the tracking error. At the same time, the deformation of the leaf springs 33, 34, that is, the amount of movement of the objective lens 5 causes the inner piezoelectric elements 51', 51' to induce electric currents corresponding to the deformation of the leaf springs 33, 34. These electric currents are compared with each other at the differential amplifier 84, thereby controlling the tracking operation in the motion feed back manner and hence controlling the tracking operation in a smooth manner. In the present embodiment, the construction and control operation of the movable tracking member including the other leaf spring 34 and those of the movable focusing member are omitted.

Figure 19:
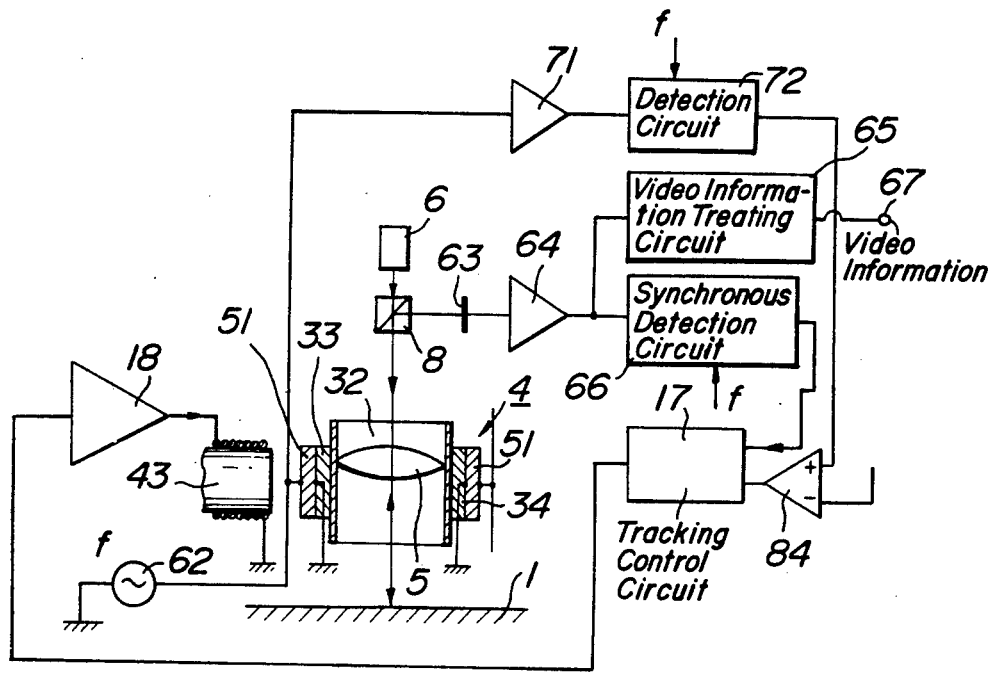
FIG. 19 is a diagrammatic view of another embodiment of an optical information read out apparatus according to the invention.

FIG. 19 shows another embodiment of an optical information read out apparatus according to the invention. The apparatus of the present embodiment comprises the tracking mechanism shown in FIG. 15 and including a piezoelectric element secured to one side of each tracking leaf spring and a tracking control circuit shown in FIG. 17. In the present embodiment, the objective lens driving mechanism 4 is symmetrical with respect to the optical axis of the objective lens 5, so that the movable tracking movable member including the leaf spring 33 is only diagrammatically shown in FIG. 19.

In the present embodiment, the piezoelectric element 51 has connected thereto a voltage source 62 as in the case of the embodiment shown in FIG. 17. The voltage source 62 serves to minutely oscillate the objective lens 5 with a constant amplitude and frequency f. The synchronous detection circuit 66 functions to detect the tracking error signal which is supplied through the tracking control circuit 17 and amplifier 18 to the electromagnet 43, thereby moving the objective lens 5 and hence correcting the tracking error. In this case, the piezoelectric element 51 is deformed and minutely oscillated in response to the tracking operation effected by the electromagnet 43.

As a result, the piezoelectric element 51 can supply an electric signal including a signal corresponding to the deformation of the piezoelectric element 51, that is, the amount of movement of the objective lens 5 and superimposed thereon. In the present embodiment, the above mentioned electric current is supplied through an amplifier 71 to a detection circuit 72 which functions to supply a signal corresponding to the deformation of the piezoelectric element 51. This signal and a signal corresponding to the deformation of the piezoelectric element 51 secured to the leaf spring 34 are supplied through the differential amplifier 84 to the tracking control circuit 17, thereby controlling the tracking operation in the motion feed back manner and hence controlling a tracking operation in the smooth manner.

As seen from the above, in the present embodiment, the piezoelectric element 51 is secured to the leaf spring 33 for resiliently holding the objective lens 5 and a given signal is supplied to the piezoelectric element 51 or use is made of an output signal derived from the piezoelectric element 51. As a result, the optical information read out apparatus of the present embodiment can control the movement of the objective lens in a given direction with a high precision, is simple in construction, small in size and light in weight.

Figure 20:
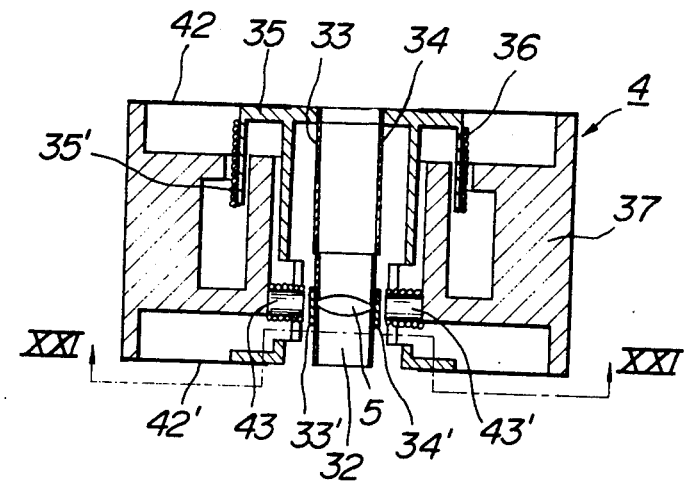
FIG. 20 is a cross-sectional view of another embodiment of a focusing and tracking mechanism according to the invention.
Figure 21:
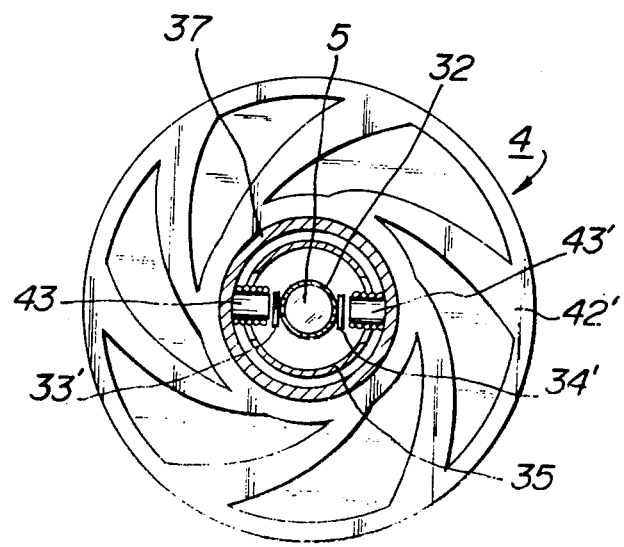
FIG. 21 is a section on line XXI—XXI of FIG. 20.

FIGS. 20 and 21 show another embodiment of an objective lens driving mechanism according to the invention. In the present embodiment, the lens holding cylinder 32 is connected through two leaf springs 33, 34 to a coil bobbin 35. The coil bobbin 35 is connected through two spider-shaped leaf springs 42, 42' to a magnet 37 and is provided with a cylindrical portion 35' around which is wound a coil 36.

In the objective lens driving mechanism 4 constructed as above described, an electric current corresponding to the focusing error signal is supplied to the coil 36 so as to move the objective lens 5 in its optical axis direction and effect the focusing operation. In addition, an electric signal corresponding to the amount of movement of the objective lens 5, that is, the deformation of the leaf springs 33, 34 is derived from a piezoelectric element (not shown) secured to at least one of the leaf springs 33, 34. The electric signal derived from the piezoelectric element is fed back to the tracking control circuit, so that it is possible to effect the tracking operation in a motion feed back manner with a high precision.

In the present embodiment, an objective lens holding cylinder 32 is supported by two tracking leaf springs 33, 34 extending in the optical axis direction of the objective lens 5. These two tracking leaf springs 33, 34 are secured to a coil bobbin 35 which is supported by two focusing leaf springs 42, 42' secured at their one ends to the upper and lower surfaces of a magnet 37. Since these two focusing leaf springs 42, 42' are sufficiently distant from each other, it is possible to effectively prevent the optical axis of the objective lens 5 from inclining. Two electromagnets 43, 43' are arranged at diametrically opposite positions of the objective lens holding cylinder 32 and spaced apart therefrom as in the case of the embodiment shown in FIGS. 4 and 5. The objective lens holding cylinder 32 is provided at those positions thereof which are opposed to the electromagnets 43, 43' with magnetic members 33', 34'.

In the present embodiment, if use is made of the electromagnets 43, 43' for the purpose of correcting the tracking error, it is not necessary to make the leaf springs 33, 34 as a whole magnetic. That portion of the leaf spring or objective lens holding cylinder which is opposed to the electromagnets 43, 43' may be formed of magnetic material. In this case, the magnetic members 33', 34' secured to the objective lens holding cylinder 32 as shown in FIGS. 20 and 21 can be omitted.

Figure 22:
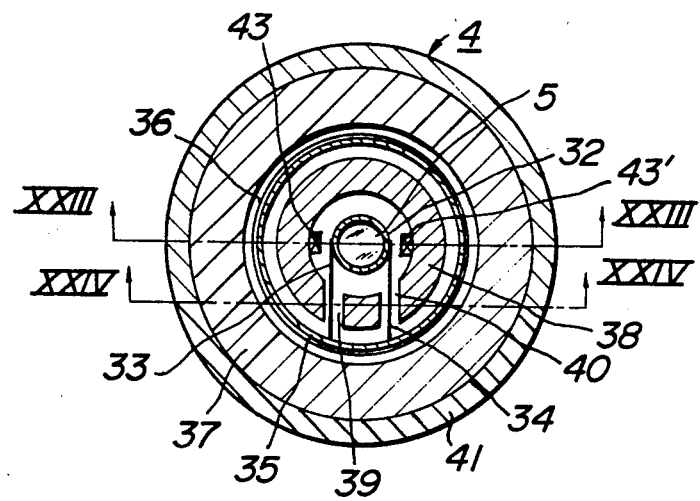
FIG. 22 is a cross-sectional view of another embodiment of a focusing and tracking mechanism according to the invention.
Figure 23:
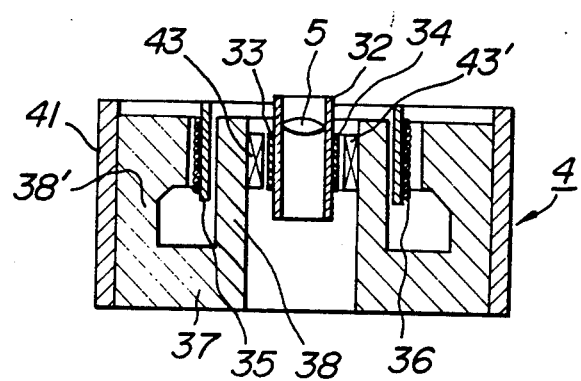
FIG. 23 is a section on line XXIII—XXIII of FIG. 22.

FIGS. 22 and 23 show another embodiment of an objective lens driving mechanism according to the invention. In the present embodiment, an objective lens holding cylinder 32 is connected to a coil bobbin through two magnetic leaf springs 33, 34 extending in parallel in the same direction which is perpendicular to the optical axis of the objective lens 5.

Figure 24:
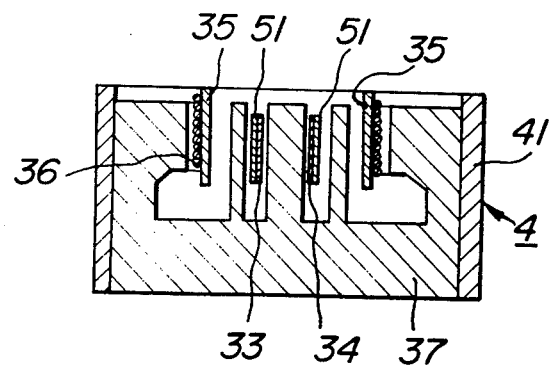
FIG. 24 is a section on line XXIV—XXIV of FIG. 22 and showing piezoelectric elements secured to both tracking leaf springs, respectively.

FIG. 24 shows another embodiment of an objective lens driving mechanism according to the invention. In the present embodiment, piezoelectric elements 51, 51 are secured to the leaf springs 33, 34 of the embodiment shown in FIGS. 22 and 23.

Figure 25:
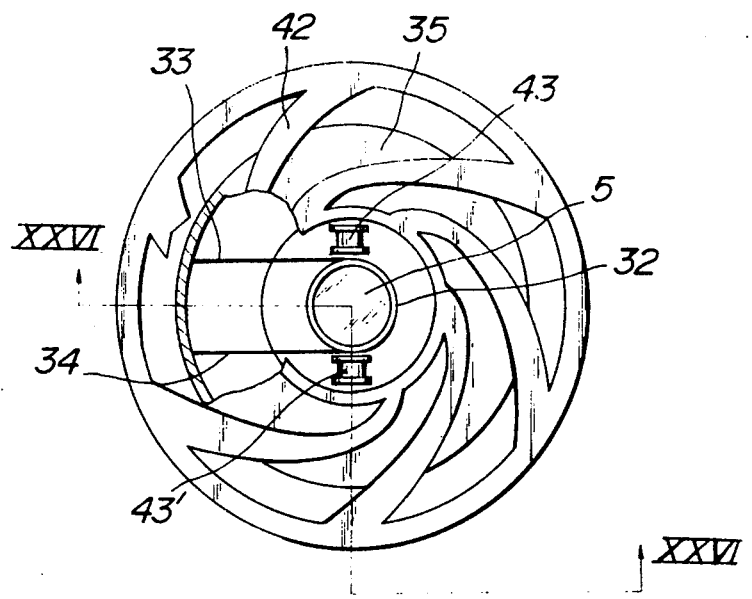
FIG. 25 is a plan view of another embodiment of a focusing and tracking mechanism according to the invention.
Figure 26:
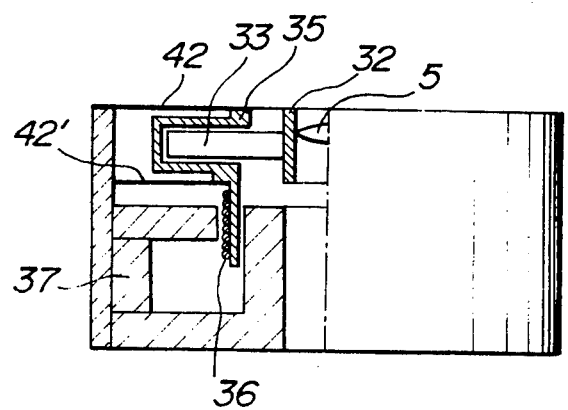
FIG. 26 is a section on line XXVI—XXVI of FIG. 25.

FIGS. 25 and 26 show another embodiment of an objective lens driving mechanism according to the invention. In the present embodiment, a coil bobbin 35 is supported by two focusing leaf springs 42 and 42' and to the coil bobbin 35 are secured two tracking leaf springs 33, 34. These two tracking leaf springs 33, 34 extend in parallel with each other in the same radial direction and serve to hold an objective lens holding cylinder 32 and hence an objective lens 5. The remaining parts and the operation of the present embodiment are substantially the same as those of the embodiment described with reference to FIGS. 9 and 10.

FIGS. 27A to 27F show various embodiments of a tracking leaf spring.

Figure 27A:
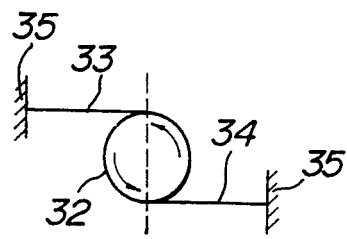
FIGS. 27A to 27F are cross-sectional views of various embodiments of a focusing and tracking mechanism according to the invention.

FIG. 27A shows tracking leaf springs 33, 34 for connecting those diametrically opposite ends of an objective lens holding cylinder 32 which are located on the tracking direction shown by dotted lines to a coil bobbin 35 so as to cause the objective lens holding cylinder 32 to rotate in counterclockwise direction as shown by an arrow.

Figure 27B:
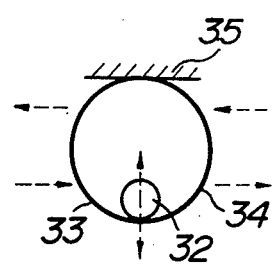

FIG. 27B shows semi-circular tracking leaf springs 33, 34 made integral into one circle and for connecting that point of an objective lens holding cylinder 32 which is opposite to a coil bobbin 35, to the latter so as to cause the objective lens holding cylinder 32 to move not only in the tracking direction but also in the focusing direction as shown by dotted line arrows.

Figure 27C:
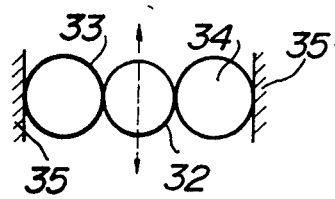
Figure 27D:
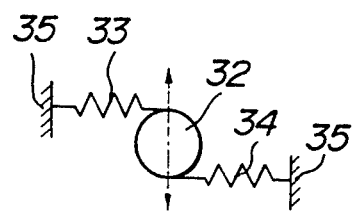

FIG. 27C shows two circular tracking leaf springs 33, 34 for connecting those diametrically opposite ends of an objective lens holding cylinder 32 which are located on a plane perpendicular to the tracking direction to a coil bobbin 35, so as to cause the objective lens holding cylinder 32 to move in the tracking direction as shown by dotted arrows FIG. 27D shows corrugated tracking leaf springs 33, 34 for connecting those diametrically opposite ends of an objective lens holding cylinder 32 which are located in the tracking direction to a coil bobbin 35, so as to cause the objective lens holding cylinder 32 to move in the tracking direction as shown by dotted line arrows.

Figure 27E:
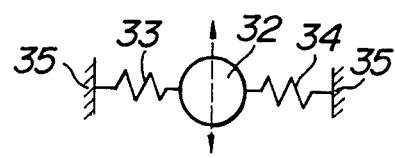

FIG. 27E shows corrugated tracking leaf springs 33, 34 for connecting those diametrically opposite ends of an objective lens holding cylinder 32 which are located at positions which are perpendicular to the tracking direction to a coil bobbin 35, so as to cause the objective lens holding cylinder 32 to move in the tracking direction as shown by dotted line arrows.

Figure 27F:
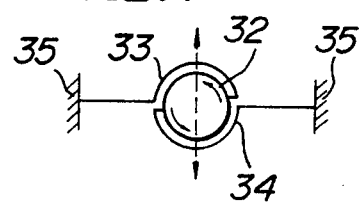

FIG. 27F shows semi-circular tracking leaf springs 33, 34 for connecting diametrically opposite ends of an objective lens holding cylinder 32 to a coil bobbin 35, so as to cause the objective lens holding cylinder 32 not only to rotate in counterclockwise direction shown as by the arrow but also to move in the tracking direction shown by dotted line arrows.

Figure 28A:
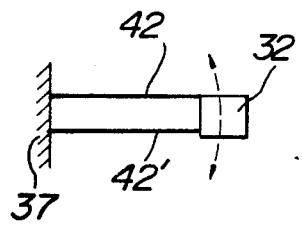
FIGS. 28A and 28B are cross-sectional views of a further two embodiments of a focusing and tracking mechanism according to the invention.

FIG. 28A shows another embodiment of a focusing leaf spring. In the present embodiment, use is made of two cantilever leaf springs 42, 42' so as to connect an objective lens holding body 32 to a magnet 37 and hence to cause the objective lens holding body 32 to move in an arcuate focusing direction as shown by dotted line arrows.

Figure 28B:
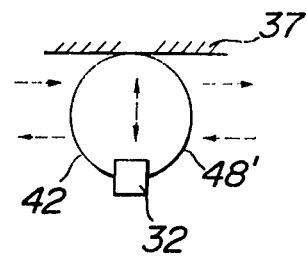

FIG. 28B shows a further embodiment of a focusing leaf spring. In the present embodiment, use is made of two semi-circular leaf springs 42, 42' so as to connect an objective lens holding body 32 to a magnet 37 and hence to cause the objective lens holding body 32 to move not only in a focusing direction in parallel to the magnet 37 but also in a tracking direction perpendicular to the magnet 37.

As stated hereinbefore, the optical information read out apparatus according to the invention has a number of advantages. In the first place, it is possible to effectively prevent an undesirable movement of an objective lens other than in the direction desired for correcting the focusing and tracking error. Secondly, a movable member for correcting the focusing and tracking error is mainly composed of an objective lens only and hence is light in weight and small in size, so that it is possible to make the focusing and tracking mechanism small in size. Third, since the tracking movement of the movable member for correcting the tracking error is minute in amplitude, it is possible to make the tracking mechanism light in weight. Finally, the load subjected to the movable member in the case of correcting the focusing error need also not be made heavy.

The invention is not limited to the above mentioned embodiments, but many modifications and alterations may be made. For example, the leaf spring for focusing the objective lens is not limited to a spider-shaped spring, since use may also be made of a square-shaped leaf spring.

In the embodiment shown in FIG. 1, use has been made of one read out light flux and two tracking light fluxes in order to obtain the tracking error signal. Alternatively, these two tracking light fluxes may be omitted and two reflected light components located at both sides of the reflected read out light flux may be incident on two photoelectric converters whose two outputs may be subtracted from each other to obtain a tracking error signal.

In the embodiment shown in FIG. 12, the piezoelectric element 51 has been secured to one side surface of one of the leaf springs. But, the piezoelectric element 51 may be secured to both side surfaces of the leaf spring or may be secured to both the leaf springs as shown in FIGS. 16 and 17, respectively.

In addition, in the embodiments shown in FIGS. 15, 16, 17 and 19, the piezoelectric element may be secured to one of the two leaf springs.

In the above described embodiment shown in FIG. 1, the focusing and tracking control signals are detected from the light reflected at the video disc 1. Alternatively, use may be made of light passing through the video disc 1 for the purpose of detecting the focusing and tracking control signals.

In addition, the focusing leaf spring may be made rotatable relative to the coil bobbin for supporting the objective lens through the tracking leaf spring and the position of the coil bobbin may be made not changeable even when the focusing leaf spring becomes minutely rotated about the optical axis of the objective lens in the case of the focusing operation. Alternatively, the focusing leaf spring may be composed of a pair of band-shaped parallel leaf springs which are the same as the tracking leaf springs. Such focusing leaf springs could not be rotated in the case of the focusing operation.

What is claimed is:

1. An optical information read out apparatus comprising a light source, a record medium including an information track spirally or concentrically recorded thereon, an optical system including an objective lens movably supported by its holding body, said optical system receiving a light from said light source and projecting a read out light spot onto said record medium, and a focusing and tracking mechanism for driving said objective lens so as to correct a relative displacement between said information track and said read out light spot, said mechanism including a first leaf spring having one end connected to said objective lens or its holding body and another end connected to a first supporting member, a second leaf spring having one end connected to said objective lens or its holding body and another end connected to a second supporting member, said first and second leaf springs being symmetrically arranged with respect to an optical axis of said objective lens or a plane inclusive of said optical axis and a track direction, and a pair of opposed electromagnets between which are arranged said first and second leaf springs and said objective lens with or without its holding body, either one or both of said leaf springs and said objective lens holding body being formed of magnetic material.

2. The apparatus according to claim 1, including a piezoelectric element secured to said first leaf spring, a voltage having a constant amplitude and frequency being supplied to said piezoelectric element so as to minutely oscillate said objective lens in a direction perpendicular to its optical axis and said track and then detect a tracking error signal for said track recorded on said record medium.

3. The apparatus according to claim 1, wherein a piezoelectric element is secured to a focusing leaf spring and a focusing signal is supplied to a coil wound around a bobbin so as to move said objective lens in its optical axis direction, said piezoelectric element detecting an electric signal produced in response to the amount of deformation of said focusing leaf spring, thereby effecting a motion feed back of said coil.

4. The apparatus according to claim 1 and further comprising a motion feed back circuit including a tracking control circuit supplied with a tracking error signal and connected through an amplifier to piezoelectric elements secured to said leaf springs and a differential amplifier having input terminals connected to said piezoelectric elements and an output terminal connected to said tracking control circuit.

5. The apparatus according to claim 4, wherein a piezoelectric element is secured to a focusing leaf spring and a focusing signal is supplied to a coil wound around a bobbin so as to move said objective lens in its optical axis direction, said piezoelectric element detecting an electric signal produced in response to the amount of deformation of said focusing leaf spring, thereby effecting a motion feed back of said coil.

6. The apparatus according to claim 1 and further comprising a magnetic member secured to that portion of said first or second leaf spring, objective lens or its holding body which is opposed to the respective electromagnet.

7. The apparatus according to claim 6, including a piezoelectric element secured to that portion of said first leaf spring at which said magnetic member is not present, a voltage having a constant amplitude and frequency being supplied to said piezoelectric element so as to minutely oscillate said objective lens in a direction perpendicular to its optical axis and said track and then detect a tracking error signal for said track recorded on said record medium.

8. The apparatus according to claim 6, wherein a piezoelectric element is secured to a focusing leaf spring and a focusing signal is supplied to a coil wound around a bobbin so as to move said objective lens in its optical axis direction, said piezoelectric element detecting an electric signal produced in response to the amount of deformation of said focusing leaf spring, thereby effecting a motion feed back of said coil.

9. The apparatus according to claim 6 and further comprising a motion feed back circuit supplied with a tracking error signal and connected through an amplifier to piezoelectric elements secured to said magnetic members and a differential amplifier having input terminals connected to said piezoelectric elements and an output terminal connected to said tracking control circuit.

10. The apparatus according to claim 9, wherein a piezoelectric element is secured to a focusing leaf spring and a focusing signal is supplied to a coil wound around bobbin so as to move said objective lens in its optical axis direction, said piezoelectric element detecting an electric signal produced in response to the amount of deformation of said focusing leaf spring, thereby effecting a motion feed back of said coil.

11. An optical information read out apparatus comprising a light source, a record medium including an information track spirally or concentrically recorded thereon, an optical system including an objective lens movably supported by its holding body, said optical system receiving a light from said light source and projecting a read out light spot onto said record medium and a focusing and tracking mechanism for driving said objective lens so as to correct a relative displacement between said information track and said read out light spot, said mechanism including a first leaf spring having one end connected to said objective lens or its holding body and another end connected to a first supporting member, a second leaf spring having one end connected to said objective lens or its holding body and another end connected to a second supporting member, said first and second leaf springs being symmetrically arranged with respect to an optical axis of said objective lens or a plane inclusive of said optical axis and a track direction and a piezoelectric element for each leaf spring and each secured respectively to said first and second leaf springs, said piezoelectric element being supplied with a tracking control signal and moving said objective lens.

12. The apparatus according to claim 11, wherein a piezoelectric element is secured to a focusing leaf spring and a focusing signal is supplied to a coil wound around a bobbin so as to move said objective lens in its optical axis direction, said piezoelectric element detecting an electric signal produced in response to the amount of deformation of said focusing leaf spring, thereby effecting a motion feed back of said coil.

13. The apparatus according to claim 11 and further comprising a motion feed back circuit including a tracking control circuit supplied with a tracking error signal and connected through an amplifier to other piezoelectric elements each secured to a respective leaf spring and a differential amplifier having input terminals connected to said other piezoelectric elements and an output terminal connected to said tracking control circuit.

14. The apparatus according to claim 13, wherein a piezoelectric element is secured to a focusing leaf spring and a focusing signal is supplied to a coil wound around a bobbin so as to move said objective lens in its optical axis direction, said piezoelectric element detecting an electric signal produced in response to the amount of deformation of said focusing leaf spring, thereby effecting a motion feed back of said coil.

15. The apparatus according to claim 11 and further comprising a tracking signal deriving circuit including a voltage source connected to said piezoelectric elements secured to said leaf springs and for supplying a voltage having a constant amplitude and frequency to said piezoelectric elements, whereby said objective lens minutely oscillates in a direction perpendicular to its optical axis and said track so as to detect a tracking error signal.

16. The apparatus according to claim 15, wherein a piezoelectric element is secured to a focusing leaf spring and a focusing signal is supplied to a coil wound around a bobbin so as to move said objective lens in its optical axis direction, said piezoelectric element detecting an electric signal produced in response to the amount of deformation of said focusing leaf spring, thereby effecting a motion feed back of said coil.

* * * * *